(12) United States Patent
Singhal et al.

(10) Patent No.: US 12,086,448 B2
(45) Date of Patent: *Sep. 10, 2024

(54) DEPLOYING MICROSERVICES INTO VIRTUALIZED COMPUTING SYSTEMS

(71) Applicant: Nutanix, Inc., San Jose, CA (US)

(72) Inventors: Pravin Singhal, Cupertino, CA (US); Anand Jayaraman, Cupertino, CA (US); Aroosh Sohi, Los Gatos, CA (US)

(73) Assignee: Nutanix, Inc., San Jose, CA (US)

( * ) Notice: Subject to any disclaimer, the term of this patent is extended or adjusted under 35 U.S.C. 154(b) by 244 days.

This patent is subject to a terminal disclaimer.

(21) Appl. No.: 17/457,596

(22) Filed: Dec. 3, 2021

(65) Prior Publication Data
US 2022/0237052 A1 Jul. 28, 2022

Related U.S. Application Data

(63) Continuation of application No. 16/528,491, filed on Jul. 31, 2019, now Pat. No. 11,194,632.

(Continued)

(51) Int. Cl.
*G06F 3/06* (2006.01)
*G06F 8/60* (2018.01)
(Continued)

(52) U.S. Cl.
CPC ............. *G06F 3/0647* (2013.01); *G06F 8/60* (2013.01); *G06F 9/445* (2013.01); *G06F 9/5077* (2013.01);
(Continued)

(58) Field of Classification Search
CPC ............. G06F 9/5077; G06F 9/45558; G06F 2009/4557; G06F 8/60
See application file for complete search history.

(56) References Cited

U.S. PATENT DOCUMENTS

| 7,644,137 B2 | 1/2010 | Bozak et al. |
| 8,549,518 B1 | 10/2013 | Aron et al. |

(Continued)

OTHER PUBLICATIONS

Poitras, Steven. "The Nutanix Bible" (Sep. 9, 2022), from https://nutanixbible.com/ (Publication date based on indicated capture date by Archive.org; first publication date unknown).

(Continued)

*Primary Examiner* — Jacob D Dascomb
(74) *Attorney, Agent, or Firm* — Vista IP Law Group, LLP

(57) ABSTRACT

Methods, systems and computer program products for configuring microservices platforms in one or more computing clusters. In one of the computing clusters, a request to instantiate a microservice platform is received, wherein the request is received in a computing cluster having a first node and a second node, and wherein the first node and second node comprise a first virtualized storage controller and a second virtualized storage controller, respectively. The storage controllers each manage their respective storage pools comprising local storage devices. A first microservice manager is deployed on the first node and a second microservice manager is deployed on the second node. The first virtualized storage controller on the first node performs storage management operations for a first microservice instantiated by the first microservice manager, and the second virtualized storage controller on the second node performs storage management operations for a second microservice instantiated by the second microservice manager.

31 Claims, 9 Drawing Sheets

Related U.S. Application Data

(60) Provisional application No. 62/863,201, filed on Jun. 18, 2019.

(51) Int. Cl.
*G06F 9/445* (2018.01)
*G06F 9/50* (2006.01)
*G06F 9/455* (2018.01)

(52) U.S. Cl.
CPC .. *G06F 9/45558* (2013.01); *G06F 2009/4557* (2013.01)

(56) References Cited

U.S. PATENT DOCUMENTS

| | | | |
|---|---|---|---|
| 8,601,473 B1 | 12/2013 | Aron et al. | |
| 8,667,500 B1 | 3/2014 | Ji et al. | |
| 8,799,920 B2 | 8/2014 | Lubsey et al. | |
| 8,850,130 B1 | 9/2014 | Aron et al. | |
| 8,943,032 B1* | 1/2015 | Xu | G06F 16/119 707/661 |
| 9,531,639 B2 | 12/2016 | Bookman et al. | |
| 9,571,567 B2 | 2/2017 | Shu et al. | |
| 9,635,097 B2 | 4/2017 | Wang et al. | |
| 9,727,355 B2 | 8/2017 | Holler et al. | |
| 9,772,866 B1 | 9/2017 | Aron et al. | |
| 10,176,550 B1 | 1/2019 | Baggerman | |
| 10,430,238 B1* | 10/2019 | Rohrbach | G06F 9/5077 |
| 2014/0149590 A1 | 5/2014 | Mallipeddi et al. | |
| 2015/0121371 A1 | 4/2015 | Gummaraju et al. | |
| 2017/0075727 A1 | 3/2017 | Cropper et al. | |
| 2018/0004544 A1 | 1/2018 | Vasiltschenko et al. | |
| 2018/0088935 A1 | 3/2018 | Church et al. | |
| 2018/0131764 A1* | 5/2018 | Suter | G06F 9/547 |
| 2018/0136931 A1* | 5/2018 | Hendrich | G06F 11/30 |
| 2018/0267991 A1* | 9/2018 | Desai | G06F 16/11 |
| 2018/0314543 A1* | 11/2018 | Madampath | G06F 9/44 |
| 2019/0294449 A1 | 9/2019 | Leon et al. | |
| 2019/0297037 A1 | 9/2019 | Peruri et al. | |
| 2020/0034257 A1 | 1/2020 | Mahmood et al. | |
| 2020/0097670 A1* | 3/2020 | Seshadri | H04L 63/20 |
| 2020/0127939 A1 | 4/2020 | Parker et al. | |
| 2020/0257676 A1 | 8/2020 | Zhang et al. | |
| 2020/0257968 A1* | 8/2020 | Mitra | G06F 9/4881 |
| 2020/0344290 A1* | 10/2020 | Krishnaswamy | G06F 9/5083 |

OTHER PUBLICATIONS

"Citrix XenDesktop 7.1 on Microsoft Hyper-V Server 2012 R2 on Nutanix Virtual Computing Platform-Solution Design," Citrix Validated Solutions, Prepared by: Citrix APAC Solutions, dated Jun. 25, 2014.

Non-Final Office Action for U.S. Appl. No. 16/528,491 dated Mar. 16, 2021.

Notice of Allowance for U.S. Appl. No. 16/528,491 dated Aug. 2, 2021.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "The Nutanix Bible" (Jun. 25, 2018), from https://nutanixbible.com/.

Poitras, Steven. "The Nutanix Bible" (Jan. 8, 2019), from https://nutanixbible.com/.

Poitras, Steven. "The Nutanix Bible" (Jul. 9, 2019), from https://nutanixbible.com (Publication date based on indicated capture date by Archive.org; first publication date unknown).

Cano, I. et al., "Curator: Self-Managing Storage for Enterprise Clusters", *14th USENIX Symposium on Networked Systems Design and Implementation*, NSDI '17, (Mar. 27, 2017).

VMware, "Automating High Availability (HA) Services with VMware HA", VMware Technical Note, (Revised on Jun. 5, 2006).

VMware, "VMware vSphere Basics", ESXi 5.0—VMware Documentation, (Aug. 25, 2011), date retrieved from google.

Kubernetes, "Running in multiple zones", Kubernetes, (Modified on Mar. 16, 2020).

Poitras, Steven. "The Nutanix Bible" (Feb. 3, 2020), from https://nutanixbible.com/ (Publication date based on indicated capture date by Archive.org; first publication date unknown).

Poitras, Steven. "The Nutanix Bible" (Aug. 1, 2020), from https://nutanixbible.com/ (Publication date based on indicated capture date by Archive.org; first publication date unknown).

Poitras, Steven. "The Nutanix Bible" (Jan. 30, 2021), from https://nutanixbible.com/ (Publication date based on indicated capture date by Archive.org; first publication date unknown).

"A Basic Guide to Kubernetes Storage: PVS, PVCs, Statefulsets and More," Portworx, dated Dec. 1, 2017.

Cormac, "A closer look at Portworx," Portworx, dated May 24, 2017.

Dodsley, S., "All-Flash Platform-as-a-Service: Pure Storage and Red Hat OpenShift Reference Architecture," Il Blog Di Red Hat, dated May 23, 2018.

"A Guide of PostgreSQL on Kubernetes: In terms of storage," PGConf.Asia 2018 @track B#1, dated Dec. 12, 2018.

Biyani, V., et al., "Deploying and Scaling Kubernetes with Rancher," Rancher Labs, dated Mar. 2017.

Pure Service Orchestrator, Purestorage, copyright 2019.

Larsson, O., "Running Databases in a Kubernetes Cluster," Master Thesis, UMEA University, dated 2019.

"IBM Storage Enabler for Containers Version 2.0.0—User Guide," IBM, Copyright 2019.

"Introducing STORK: Intelligent Storage Orchestration for Kubernetes," Portworx, dated Jan. 31, 2018.

Gain, C., "Kubernetes and the Challenge of Adding Persistent Storage," TheNewStack, dated May 24, 2018.

Mohr, A., "Kubernetes: Container Orchestration and Micro-Services," University of Washington, dated Nov. 16, 2016.

"Persistent Storage for Kubernetes using Hedvig," Hedvig, copyright 2018.

"Platform-as-a-Service," Purestorage, copyright 2019.

Robinson, J., "Stateful Kubernetes Applications Made Easier: PSO and FlashBlade," Medium, dated Feb. 20, 2019.

Au, M., "Topology-Aware Volume Provisioning in Kubernetes," Kubernetes Blog, dated Oct. 11, 2018.

\* cited by examiner

DEPLOYING MICROSERVICES INTO VIRTUALIZED COMPUTING SYSTEMS

RELATED APPLICATIONS

The present application is a continuation of U.S. patent application Ser. No. 16/528,491 titled "DEPLOYING MICROSERVICES INTO VIRTUALIZED COMPUTING SYSTEMS", filed on Jul. 31, 2019, which claims the benefit of priority to U.S. Patent Application Ser. No. 62/863,201 titled "DEPLOYING MICROSERVICES INTO VIRTUALIZED COMPUTING SYSTEMS", filed on Jun. 18, 2019, which are hereby incorporated by reference in their entirety.

FIELD

This disclosure relates to computing systems, and more particularly to techniques for deploying microservices into virtualized computing systems.

BACKGROUND

Computerized functions have long been delivered as code and data that has been amalgamated into an application. An application comprises executable program code as well as any data that the program code might need. Such an application can be installed into a node of a computing system, after which a user can launch the application and command the application to perform various functions.

As time has progressed, the capabilities of such applications have continually increased, as has the size of the application. In modern times it often happens that a single application is configured to perform many functions. The various functions can be executed in some logical order to achieve a particular result. Moreover, in many cases some of the functions can be executed independently from execution of other functions.

Concurrent with the advent of service-oriented architectures, applications have been structured as a series of independently-callable functions called microservices that can be executed on demand by a client. The benefit of decomposing an application into many smaller services is that it improves modularity. Such modularity makes the application easier to understand, and easier to develop and test. Furthermore, modularizing an application into smaller and smaller services (e.g., microservices) supports parallel development by enabling small autonomous teams to develop their respective microservices independently. As such, techniques for development and testing of microservices has caught on within the development community.

During this same timeframe, automation for deploying microservices into scalable architectures (e.g., computing clusters) has been developed. Such automation has been a boon to administrators who, in the absence of such automation, would have had to manually configure microservices into a computing cluster. The aforementioned automation deals with clusters formed of many so called "bare metal" servers. However, many computing clusters are now being deployed as virtualized systems within highly-available hyperconverged computing clusters. These virtualized systems include a host operating system that runs on "bare metal" and a guest operating system that runs on computing nodes of the cluster in the context of a hypervisor. Moreover, many of such hyperconverged computing clusters implement a storage pool that is shared by all of the nodes of the cluster.

Various complications related to placement and scalability of microservices arise in such virtualized systems. Specifically, (1) computing clusters that implement the aforementioned virtualized systems distribute data across many storage devices of the computing cluster-which introduces many placement complications, and (2) different nodes of the computing cluster are distributed across different availability zones-which introduces many scalability complications.

Unfortunately, conventional techniques for placement of microservices are unaware of the impact that the distribution of data across the many storage devices that comprise the storage pool has on the performance and resilience of the deployed microservices-thus leading to suboptimal placement and suboptimal performance of the microservices. What is needed is an improved mechanism whereby instances of microservices can be placed onto nodes of a virtualized system.

BRIEF DESCRIPTION OF THE DRAWINGS

The drawings described below are for illustration purposes only. The drawings are not intended to limit the scope of the present disclosure.

DETAILED DESCRIPTION

Figure 1:
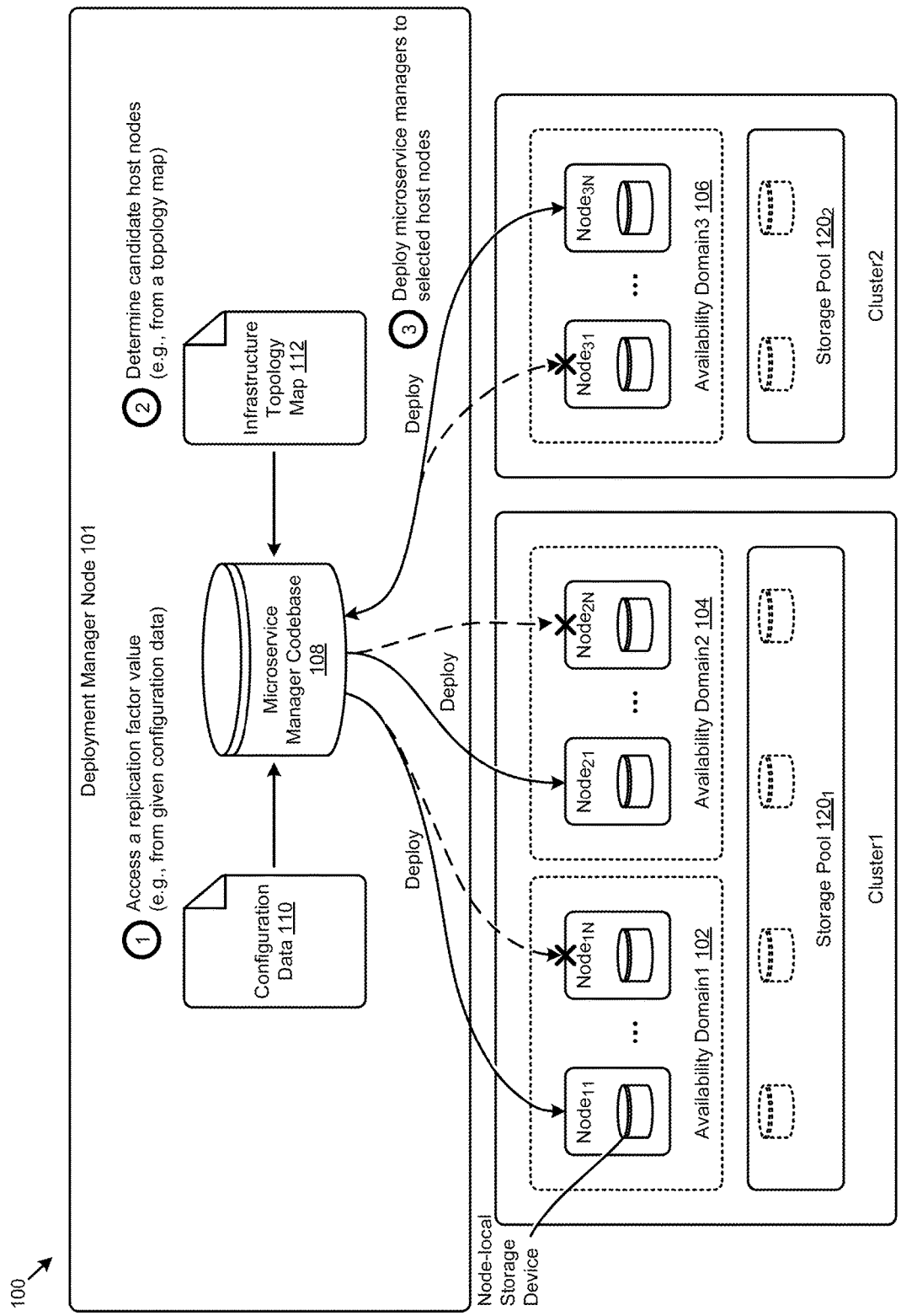
FIG. 1 presents an environment into which microservices can be deployed.

Aspects of the present disclosure solve problems associated with using computer systems for hosting highly performant and highly resilient microservices in virtualized computing systems. Some embodiments are directed to approaches for selecting nodes at which to host microservices based on performance and availability metrics. The accompanying figures and discussions herein present example environments, systems, methods, and computer program products for configuring a fault-tolerant microservice platform onto highly available virtualized computing systems.

Overview

Embodiments disclosed herein include deployment of microservice managers that run in highly available virtualized computing systems. Deployment involves placement of an instance of a microservice manager onto selected nodes of a computing system in a manner that supports high availability, even in the event of certain computing equipment failures. After placement of the microservice manager, commands can be received and carried out by the microservice manager and/or its subordinate processes. Such commands include commands to configure the microservice manager itself, after which configuration the microservice manager can monitor and balance performance of a range of microservices. In some cases, a microservice manager is deployed within or in conjunction with a virtualized storage controller. In some cases, a microservice manager is deployed within or in conjunction with a controller daemon. In some cases, a microservice manager deploys worker nodes. In some cases, a microservice manager interacts with a master controller and/or daemon (e.g., an "etcd" daemon) that runs in a cluster to provide a dynamic cluster-wise expansion and contraction capability. In some cases, a microservice manager is deployed into a virtual machine running on a node of a cluster.

Definitions and Use of Figures

Some of the terms used in this description are defined below for easy reference. The presented terms and their respective definitions are not rigidly restricted to these definitions-a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments-they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1 presents an environment 100 into which microservices can be deployed. As shown, code for a microservice management agent (e.g., the microservice manager codebase 108) is to be deployed onto several nodes (e.g., $node_{11}$, $node_{21}$, and $node_{3N}$) of a plurality of clusters (e.g., cluster1 and cluster2). The number of microservice management agents to be deployed, and the locations (e.g., nodes) to which the agents are deployed, is dependent on certain configuration values. As shown, the configuration data 110 for a particular cluster is accessed (operation 1). If the configuration data indicates a replication factor (RF) of two (RF=2), then at least two agents are to be deployed into that cluster.

Although there are many nodes that are distributed throughout the plurality of clusters, the herein-disclosed deployment techniques select only certain nodes. The determination as to which nodes of which clusters can serve as candidate nodes to host the microservice management agents is made at least in part by accessing an infrastructure topology map 112 (operation 2). The infrastructure topology map defines availability zones and identifies the set of nodes within a corresponding availability zone.

The availability domains (e.g., availability domain1 102, availability domain2 104, and availability domain3 106) might correspond to a rackable unit that is one of multiple rackable units in a rack. Or, the availability domains might correspond to a rack that is one of multiple racks in a data center. More specifically, such availability domains may correspond to hardware boundaries that are described in a data item such as the shown infrastructure topology map 112 and/or might correspond to physical or logical boundaries that are described in a data item such as the shown configuration data 110.

Given the configuration data and the infrastructure topology map, a plurality of microservice management agents (e.g., instanced from the shown microservice manager codebase) are then deployed onto candidate nodes. More specifically, one node in each availability domain is selected to host a microservice management agent.

When deploying the microservice management agents into the availability domains (operation 3), many factors are considered. Firstly, a candidate node in a particular availability domain must be sufficiently well configured with sufficient CPU power to host the agent. Secondly, the candidate node must have sufficient storage availability. Thirdly, the candidate node must meet other criteria that pertains to hosting microservices.

In the example of FIG. 1 a deployment manager node 101 implements microservice platform deployment functionality, which microservice platform deployment functionality includes determination which nodes of which clusters can serve as candidate nodes to host the microservice management agents. As depicted in the example of FIG. 1, $node_{11}$ satisfies the above conditions whereas $node_{1N}$ does not. As such, $node_{11}$ is selected to host the microservice management agent for availability domain1 whereas $node_{1N}$ is not selected. Continuing, when deploying into availability domain2, the same or similar logic is applied. As shown, node$_{21}$ is selected over node$_{2N}$. Further, when deploying into availability domain3, node$_{3N}$ satisfies the above conditions whereas node$_{31}$ does not. As such, node$_{3N}$ is selected to host the microservice management agent for availability domain3.

By first observing the topology of the computing systems in the subject environment, and by observing logic for selection of a sufficiently powerful node, a highly resilient microservice platform can be configured. Specifically, if any or all of the hardware of any availability domain suffers an outage, there still remains at least one microservice management agent that remains running on another availability domain. In addition to the resilience as heretofore described, the herein-disclosed techniques are optimized for performance. In some cases, performance of the microservice management agent—and any microservices that are under the microservice management agent, as well as performance of the system as a whole is dominated by the availability of sufficient CPU cycles to perform compute-centric operations. In other cases, performance of the microservice management agent—and any microservices that are under the microservice management agent, as well as performance of the system as a whole is dominated by the availability of sufficient storage facilities to perform storage-centric operations.

When considering availability of sufficient storage facilities to perform storage-centric operations, many underlying factors must be considered. For example, a determination must be made as to the extent and location of data that is needed by a particular microservice. As another example, the nature of storage I/O (input/output or IO) that is performed by a microservice must be considered. In some cases of execution of a microservice, data can be streamed from one location to another such that access latency is not dominant as to performance. In other cases of execution of a microservice, small bits of data are randomly accessed such that I/O latency is dominant as to performance.

Observation of storage I/O to and from the storage pools (e.g., storage pool 120$_1$, storage pool 120$_2$) can be performed by a virtualized storage controller that runs on each node. Such a virtualized storage controller is configured such that all storage I/O on a node passes through the storage controller. Such storage I/O observations can include (1) characterization and tracking of the volume of data to and from the storage pool as well as (2) characterization and tracking of the size of data packets to and from the storage pool, as well as (3) characterization and tracking of the latency of data operations to and from the storage pool.

The foregoing includes discussion of techniques to identify availability domains for hosting a microservice management agent, as well as techniques to select candidate nodes based on performance attributes. These techniques are disclosed in further detail as pertains to FIG. 2.

Figure 2:
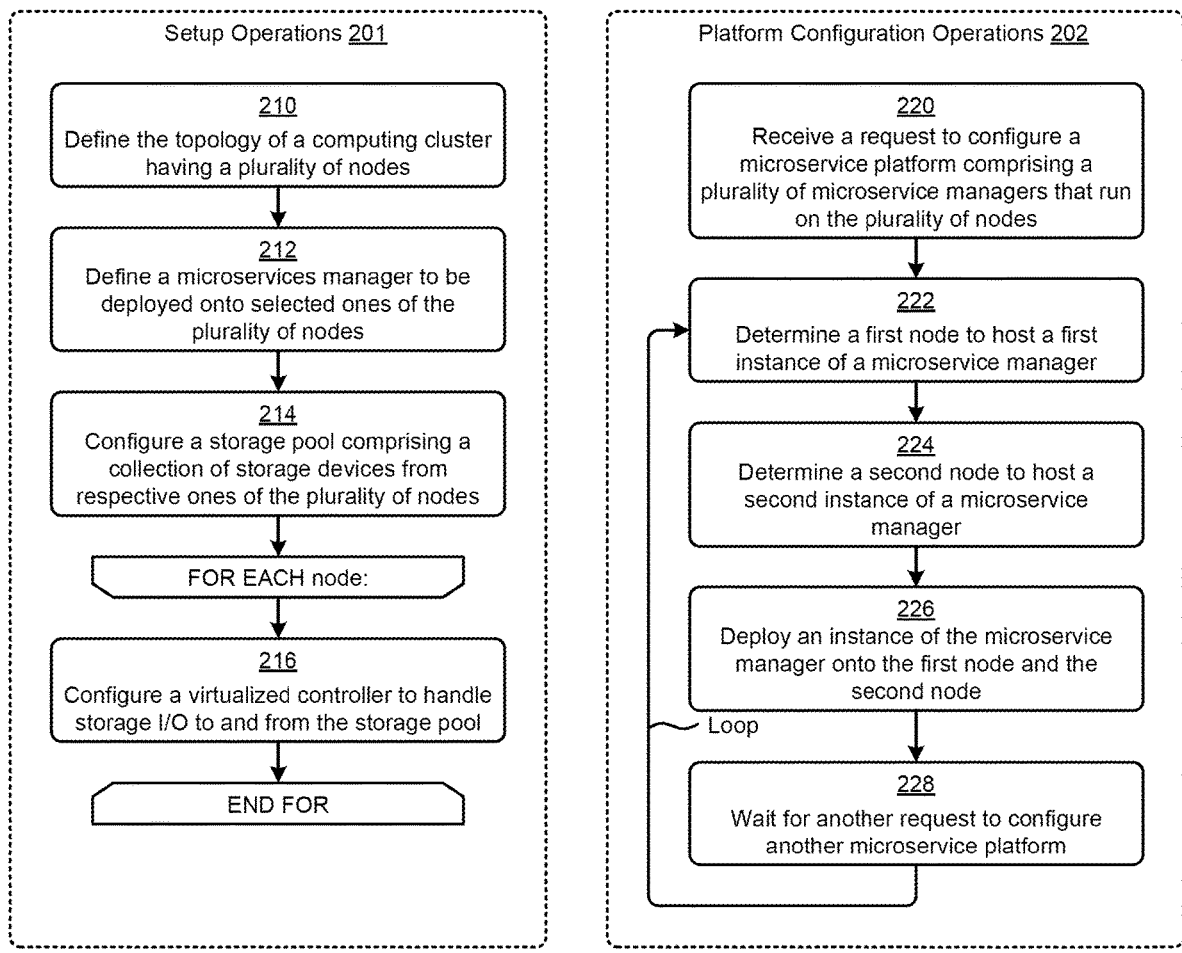
FIG. 2 depicts an example microservice manager deployment scenario for deploying microservice managers onto nodes of a virtualized computing system, according to an embodiment.

FIG. 2 depicts an example microservice manager deployment scenario 200 for deploying microservice managers onto nodes of a virtualized computing system. As an option, one or more variations of microservice manager deployment scenario 200 or any aspect thereof may be implemented in the context of the architecture and functionality of the embodiments described herein. The microservice manager deployment scenario 200 or any aspect thereof may be implemented in any environment.

FIG. 2 illustrates aspects pertaining to selecting nodes at which to host microservices based on performance and availability metrics. Specifically, the figure is being presented with respect to its contribution to addressing the problem of hosting highly performant and highly resilient microservices in virtualized computing systems.

The embodiment shown in FIG. 2 is merely one example. As shown, the microservice manager deployment scenario is implemented by a set of computerized setup operation 201 and a set of platform configuration operations 202. As shown, the setup operations serve to configure a storage pool that is shared by multiple nodes, and to configure a virtualized storage controller onto each of the multiple nodes. One specific flow through the setup operations involves codification of the topology of the computing system (step 210) including codification of the hierarchy down to nodes. For example, a data center might be composed of multiple racks, and a rack might be composed of multiple rackable units, which in turn might be composed of many nodes, which in turn might each have multiple CPUs, which in turn might have multiple cores, and so on. In addition to the foregoing hardware hierarchy, any number of availability domains can be mapped onto the hardware.

When the topology is known down to at least the node level, any given node can be considered as a candidate for hosting a microservice manager. Once the code for such a microservice manager has been defined (step 212) it can be instanced on a node of the computing system. However, before deploying an instance of a microservice manager, each node is configured with a virtualized storage controller (step 216) that handles storage I/O to and from a storage pool. Such a storage pool is formed (at step 214) of a collection of storage devices that are local to each node.

Individual ones of the collection of the storage devices are assigned an address space in the storage pool. For example, a first storage device that is 2 terabytes in size can be assigned to the address space [0 through 2T-1] of the storage pool. A second storage device that is 1 terabyte in size can be assigned to the address range [2T through 3T-1 byte1] of address space of the storage pool, and so on. Each node hosts an instance of a virtualized storage controller to handle storage commands to and from the storage pool (step 216). When the setup operations have been performed, the system is ready for configuration as a microservice platform.

As used herein, a microservice platform is a collection of microservice management agents that are deployed onto nodes of one or more computing clusters. A microservice management agent is any process or thread that can monitor operation of a microservice. Such a platform, comprising any number of microservice management agents can be configured upon request, either by a computer system administrator, or under program control by a process or thread that executes on the computer system. Platform configuration operations can commence at a particular predetermined (e.g., quiescent) moment, or platform configuration operations can commence immediately upon a request.

Specifically, and as depicted, the platform configuration operations 202 can commence upon receipt of a request to configure the microservice platform (step 220). At step 222, a first node in a first availability domain is selected to host a first instance of a microservice manager. Then, at step 224, a second node in a second availability domain is selected, and at step 226, a second instance of a microservice manager is deployed onto the second node. As such, the platform has the characteristic of being resilient, at least in that if one of the availability domains suffers an outage, there still remains at least one microservice management agent that remains running on another availability domain.

In some cases, a computing system might be augmented, such as by adding an additional cluster to the previously configured resilient microservice platform. As such, step 228 waits for another request to configure the additional cluster into the microservice platform. Upon receipt of the request (at step 228) a loop is taken.

Once the microservice platform is configured, a particular microservice management agent can be configured to facilitate access to particular microservices. For example, a particular microservice management agent can publish endpoints (e.g., a uniform resource locators (URLs)) through which processes from any location in the environment can access the particular microservices. Moreover, any particular microservice management agent can migrate its corresponding microservices to any node in any cluster. More specifically, any particular microservice management agent can migrate its corresponding microservices to any node in any cluster based on a data locality metrics and/or CPU availability metrics.

Figure 3:
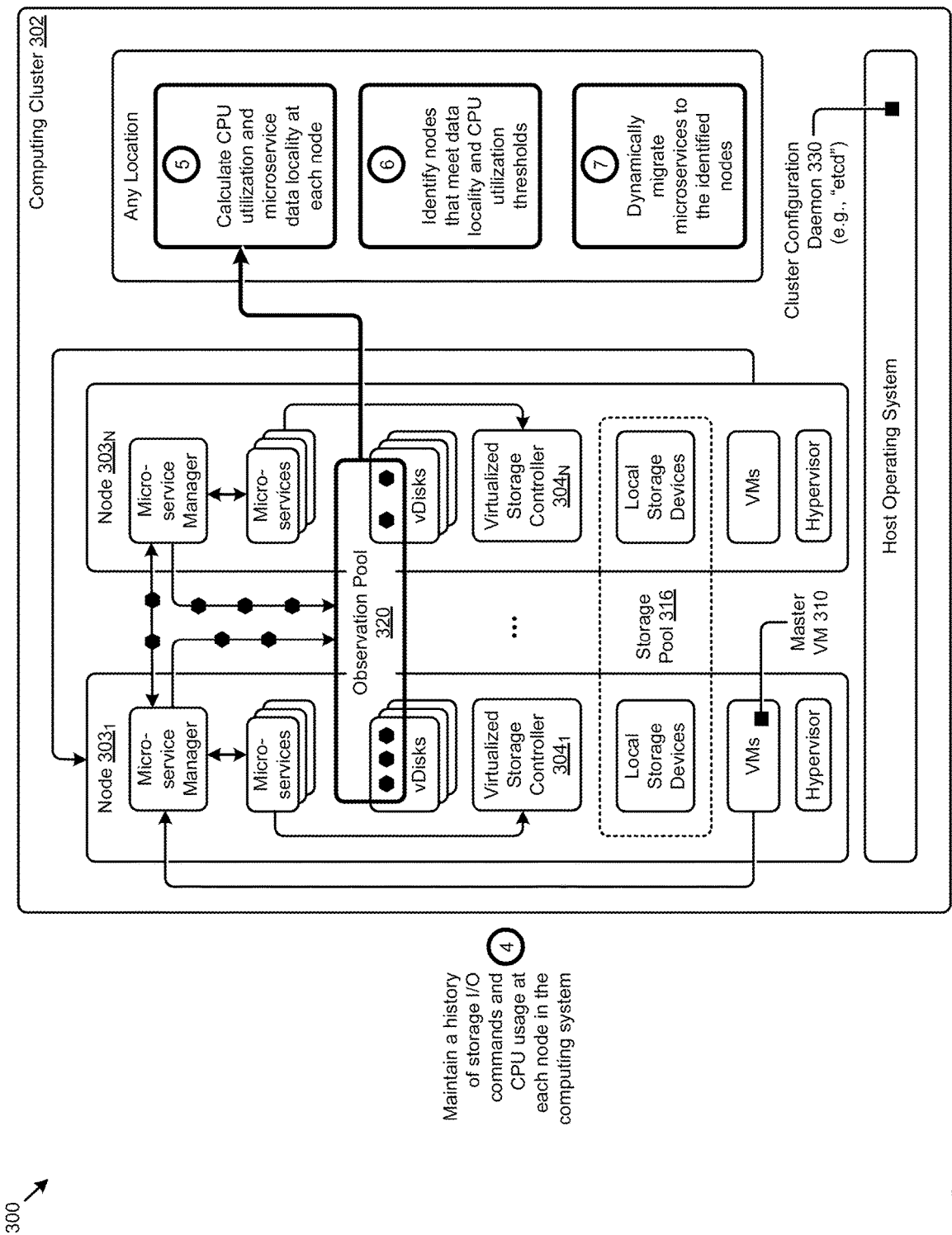
FIG. 3 depicts an example computing cluster into which highly performant and highly available microservice instances can be deployed, according to an embodiment.

A computing system that is configured such that any particular microservice management agent can migrate any instance of its corresponding microservices to any node in any cluster based on a data locality metrics and/or CPU availability metrics is shown and discussed as pertains to FIG. 3.

FIG. 3 depicts an example computing cluster 300 into which highly performant and highly available microservice instances can be deployed. As an option, one or more variations of computing cluster 300 or any aspect thereof may be implemented in the context of the architecture and functionality of the embodiments described herein. The computing cluster 300 or any aspect thereof may be implemented in any environment.

FIG. 3 illustrates aspects pertaining to selecting nodes at which to host microservices based on performance and availability metrics. Specifically, and as shown within computing cluster 302, a plurality of nodes (e.g., node $303_1$ ... , node $303_N$) each host a corresponding node-specific microservice manager. Any number of microservices can be managed by such a node-specific microservice manager. One particular management technique continuously measures data locality as well as CPU availability and, based on such data locality metrics and CPU availability metrics, the microservice manager rebalances microservices (e.g., to another node where better data locality metrics and CPU availability metrics can be achieved).

As shown, each node of computing cluster 302 includes a virtualized storage controller. (e.g., virtualized storage controller $304_1$ ... , virtualized storage controller $304_N$). Various observations taken by a particular virtualized storage controller are stored in an observation pool 320. In the example partitioning of FIG. 3, the observation pool is formed of a plurality of virtual disks ("vDisks"). Such virtual disks are logical constructions that refer to physical storage in storage pool 316. The storage pool is in turn formed of a plurality of storage devices (e.g., the shown local storage devices).

Data stored in the storage pool can be accessed through one or more virtualized storage controllers. For example, a virtual machine (e.g., the virtual machine (VM) of node $303_1$) can direct storage commands to that node's virtualized storage controller (virtualized storage controller $304_1$), which in turn can access storage devices that are local to that node and/or which can access any other physical storage that forms the shown storage pool 316.

As such, the virtualized storage controllers at any corresponding nodes are able to make observations pertaining to data locality for a microservice. For example, when a virtual machine accesses a microservice that is hosed on a particular node, the microservice accesses its data by issuing a storage I/O command through a corresponding virtualized controller. The virtualized controller can observe if the data access refers to a local storage device or if the data access refers to a storage device that is situated elsewhere.

Observations can be stored in an observation pool 320. In the example shown, the observation pool is composed of portions of vDisks. Each virtualized storage controller at any node can take observations on an ongoing basis. More specifically, each virtualized storage controller at any node can keep track of a data locality metric pertaining to each microservice. For example, a virtualized storage controller at a particular node can maintain a correspondence between a particular microservice and a running history of storage accesses. If the storage accesses are substantially directed to local storage, then the microservice is said to be operating with high data locality. On the other hand, if the storage accesses are substantially directed to non-local storage, then the microservice is said to be operating with low data locality. Additionally, using any known technique, a history of CPU availability (e.g., headroom) can be used at each node and for each CPU or CPU core in the node.

As such, the foregoing virtualized storage controllers and/or any other processes or threads can maintain a history of storage I/O commands (e.g., including data locality) and CPU usage at each node in the computing system (operation 4). At any moment in time, and from any location, a metric for data locality and a metric for CPU availability can be determined (operation 5). Each node can be individually characterized by its node-specific data locality metric and its node-specific CPU availability metric. In the event that either a node-specific data locality metric or a node-specific CPU availability metric breaches a threshold, then the node is considered for rebalancing. More specifically, in the event that execution of a microservice breaches either a node-specific data locality threshold or a node-specific CPU availability threshold, then a process or thread of the system identifies one or more nodes to be considered for rebalancing (operation 6). In the example of FIG. 3, such a node is identified, and the offending microservice is migrated to the identified node (operation 7).

In some embodiments, the aforementioned process or thread of the system can be implemented in a virtual machine, such as the shown master VM 310. Moreover, some embodiments are configured with a host operating system that supports a built-in cluster configuration daemon 330.

The embodiment shown in FIG. 3 is merely one example. As described in the foregoing, a microservice can be migrated from one node to another node based on a breach of a data locality threshold and/or based on a breach of a CPU availability threshold. Beyond merely detecting a breach and migrating the microservice to another node, the migration of the microservice can be tuned with respect to a relationship between a data locality metric and a CPU availability metric. Such a relationship and mechanisms for describing such a relationship as a tuning factor is the subject of the discussions pertaining to FIG. 4.

Figure 4:
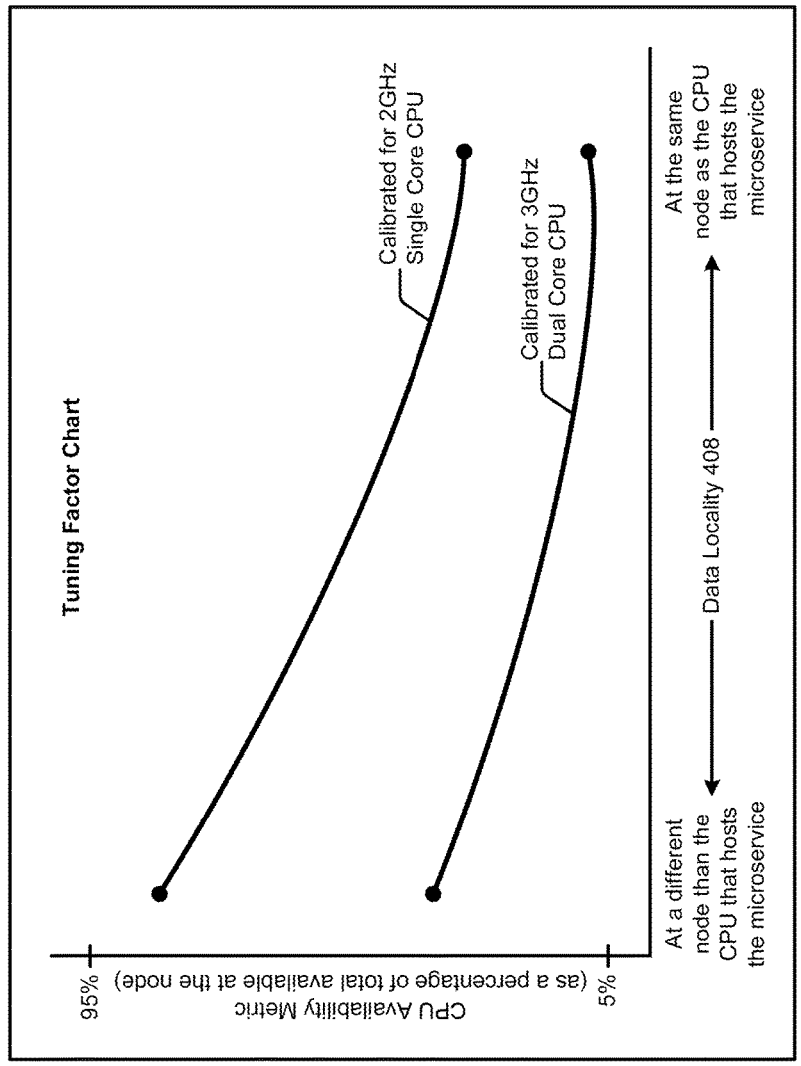
FIG. 4 is a chart depicting tuning factor curves for use with a tradeoff determination technique for determining where microservice instances can be deployed, according to an embodiment.

FIG. 4 is a chart depicting tuning factor curves for use with tradeoff determination technique 400 for determining where microservice instances can be deployed. As an option, one or more variations of tradeoff determination technique 400 or any aspect thereof may be implemented in the context of the architecture and functionality of the embodiments described herein. The tradeoff determination technique 400 or any aspect thereof may be implemented in any environment.

The various tradeoffs arise when determining where microservice instances can be deployed. Some microservices are CPU-centric while others are storage I/O-centric. A CPU-centric microservice that demands a high amount of computational power can be initially situated at a node that has a lot of CPU headroom. However, if the data that is accessed by that node during the course of execution of the microservice is located distally, and/or the data that is accessed by that node during the course of execution of the microservice becomes more and more distal, then the overall performance of the microservice might suffer and eventually might become storage I/O bound. In reverse, a microservice that performs a high amount of storage accesses can be initially situated at a node that hosts the accessed data. In such a case the microservice might become CPU bound, which would indicate that the microservice needs more computing power. What is desired is a balance between CPU boundedness and storage I/O boundedness such that the microservice performs optimally.

The shown curves on the tuning factor chart are calibrated to correspond to characteristics of particularly-configured nodes. For example, and as shown, a first tuning factor curve corresponds to a tradeoff that is calibrated for a 2 GHz CPU, whereas a first tuning factor curve corresponds to a tradeoff that is calibrated for a 3 GHz dual core CPU. The shown curves are merely examples. Other curves can be calibrated based on computation and storage I/O performance characteristics of any particular node.

The abscissa of the tuning factor chart depicts a metric pertaining to data locality 408. If the data that is accessed by a microservice is mostly data that is stored on the local storage devices of a node, then the data locality metric is said to have a high value. On the other hand, if the data that is accessed by a microservice is mostly data that is stored on other than the local storage devices of a node, then the data locality metric is said to have a low value. For tuning purposes, relatively more CPU power is needed when data is stored distally and relatively less CPU power is needed when data is stored locally. At the same time, different CPUs have different computational capabilities and, as such, a curve can be calibrated for a particular CPU type. There can be as many tuning factor curves as there are CPU configurations.

When making a selection of a node to host a migrated microservice, candidate nodes can each be evaluated with respect to their respective CPU availability as well as with respect to their data locality. If migrating a microservice to a particular candidate node would result in a high degree of data locality (e.g., corresponding to a point on the abscissa), and if the candidate node has sufficient CPU availability (e.g., corresponding to a point on the ordinate), then that node is a good candidate. When considering migration of a microservice, there may be many candidate nodes have sufficient CPU availability as well as sufficient data locality. In such cases, other factors such as the type of the local storage devices and/or the capacity of the local storage devices can be considered. Some embodiments include data locality rules.

As used herein, a data locality rule is a codification of one or more specifications or requirements that is applied to a location of data of a candidate microservice so as to determine one or more candidate nodes that would satisfy the one or more specifications or requirements when data is stored at the one or more candidate nodes.

As an example, a data locality rule might characterize a requirement that data used by a microservice is to be locally stored in node-local storage devices of a node. Such a requirement can be enforced by the virtualized storage controller at a particular node. In accordance with the semantics of one or more data locality rules, and/or to satisfy the semantics of one or more data locality rules, a virtualized storage controller at a particular node can migrate data from any location so as to store microservice data in one or more node-local storage devices of a node that hosts a corresponding microservice. In addition, or as an alternative to use of the foregoing data locality rules, a service locality rule might be used. As used herein, a service locality rule is a codification of one or more specifications or requirements that is applied to a candidate microservice so as to determine one or more candidate nodes that would satisfy the one or more specifications or requirements when the candidate microservice is deployed to run at the one or more candidate nodes.

Some, or all of the foregoing data locality rules and the foregoing service locality rules can be used either singly or in combination to determine a service location target node at which to deploy a microservice and/or to determine a data location target node at which to store data used by a corresponding microservice.

The data locality rules and service locality rules can be enforced by instantiating a microservice at a specific node that is known to be storing data (e.g., in a node-local cache or in one or more storage devices local to the specific node) that is used by the microservice to be deployed. Similarly, data locality rules and service locality rules can be enforced by situating data at a specific node that is that is the same node that hosts a corresponding microservice. The data locality rules and the service locality rules can be enforced by situating data to a particular storage device of a particular node, or by situating a microservice at a particular node. The rules can be enforced during initial deployment of a microservice or its data, or the rules can be enforced in response to a change in the topology or operational characteristics of any one or more of the virtualized storage controllers. More specifically, a microservice and/or its corresponding data can be migrated dynamically in response to a change in the topology or operational characteristics of any one or more of the virtualized storage controllers. When considering migration of a microservice (e.g., because the then-current host node of the microservice has failed, or for other reasons), a plurality of then-operational virtualized storage controllers may be polled to determine the extent to which a particular virtualized storage controller has performed storage management for the microservice being considered for migration. As such, the foregoing operational characteristics can include historical observations of storage I/O and/or CPU utilization, which are in turn used during application of the data locality rules and/or during application of the service locality rules.

Figure 5:
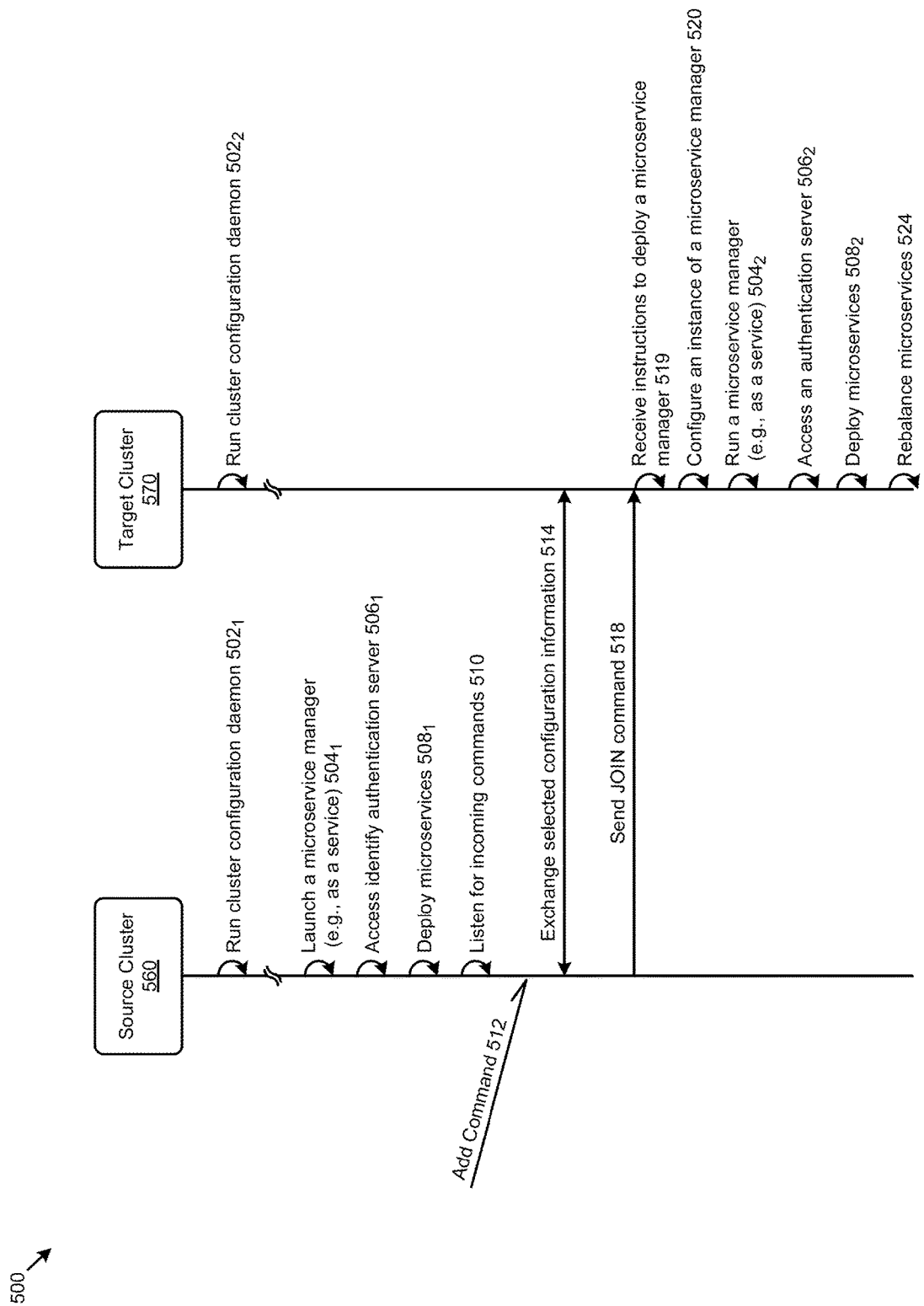
FIG. 5 exemplifies a protocol for adding a cluster onto which microservice instances can be deployed, according to an embodiment.

Still further, when considering migration of a microservice (e.g., because the then-current host node of the microservice has failed, or is oversubscribed for CPU cycles, or because the then-current host node of the microservice has oversubscribed local storage), there may be no candidate nodes in the current cluster that have sufficient CPU availability as well as sufficient data I/O performance headroom. In such a case, the microservice can be migrated to a different cluster. However, before doing so, the microservice platform needs to be configured at the target cluster. FIG. 5 presents a protocol that can be used to configure a microservice platform onto an alternative target computing cluster.

FIG. 5 exemplifies a protocol 500 for adding a cluster onto which microservice instances can be deployed. As an option, one or more variations of protocol 500 or any aspect thereof may be implemented in the context of the architecture and functionality of the embodiments described herein. The protocol 500 or any aspect thereof may be implemented in any environment.

The figure illustrates how a source cluster 560 can communicate with a target cluster 570 to configure the target cluster as a microservice platform. The shown embodiment depicts the two clusters running the same operating system. The operating system is the same or similar operating system as the operating system described in FIG. 3. More specifically, each instance of the operating system supports a cluster configuration daemon (e.g., cluster configuration daemon $502_1$ and cluster configuration daemon $502_2$).

At least one such a daemon runs on any given cluster. The daemon listens for configuration commands and, upon receipt of certain commands, the daemon launches software components that are specified by the command. In the example shown, the daemon is able to launch a microservice manager on command (operation $504_1$). The launched microservice manager runs some initialization code, after which initialization, the microservice manager can deploy authenticated microservices (operation $506_1$ and operation $508_1$).

The microservice manager listens for incoming commands 510. Then, in addition to deploying authenticated microservices and monitoring performance characteristics of the deployed microservices, the microservice manager is able to respond to, or autonomously raise, configuration commands. In this example, the microservice manager receives an add command (event 512) upon which event the microservice manager at the source cluster exchanges cluster configuration information (exchange 514) with the target cluster. At some point after the configuration between the two clusters is quiescent, JOIN command 518 is sent to the target cluster (e.g., by transmission of instructions to the target cluster). After the target cluster receives instructions to deploy a microservice manager (step 519), the target cluster takes steps to configure an instance of the microservice manager (step 520) that is specific to the architecture of the target cluster. Once configured, then a microservice manager is launched at the target node (operation $504_2$). The microservice manager accesses an identity and authentication server (operation $506_2$) and then deploys any microservices that had been specified during the configuration information exchange and/or by the JOIN command (operation $508_2$). On an ongoing basis, microservices are rebalanced (operation 524). In some cases, rebalancing includes rebalancing the platform by instantiating additional microservice managers and/or migrating microservice managers.

The foregoing description is purely for illustration. Other protocols, methods, steps, messages, operations, etc. can be employed in addition to, or as an alternative to protocol 500.

Strictly as an example, the deployed microservices might be specified in a microservices registry. Such a registry might include (1) the name of the microservice, (2) a default endpoint for the microservice, one or more entries that are configured into a cluster-local domain name server, (4) keys used for authentication, etc. The domain name server is configured to receive endpoint uniform resource locators (URLs) or other forms of network addresses, which are, by operation of the domain name server, resolved to a particular node.

As another example, the aforementioned identity and authentication server might be hosted by a plurality of nodes in a plurality of availability zones of any cluster. As such, the identity and authentication server can be made highly available, so as to be resilient to failures at the node level or failures at the availability zone level. In some cases, high availability at the cluster level is accomplished by configuring the microservice platform across three or more clusters, whereby constituent components of the microservice platform on a first node of a first cluster can take over processing from a second node of a second cluster.

ADDITIONAL EMBODIMENTS OF THE DISCLOSURE

Additional Practical Application Examples

Figure 6:
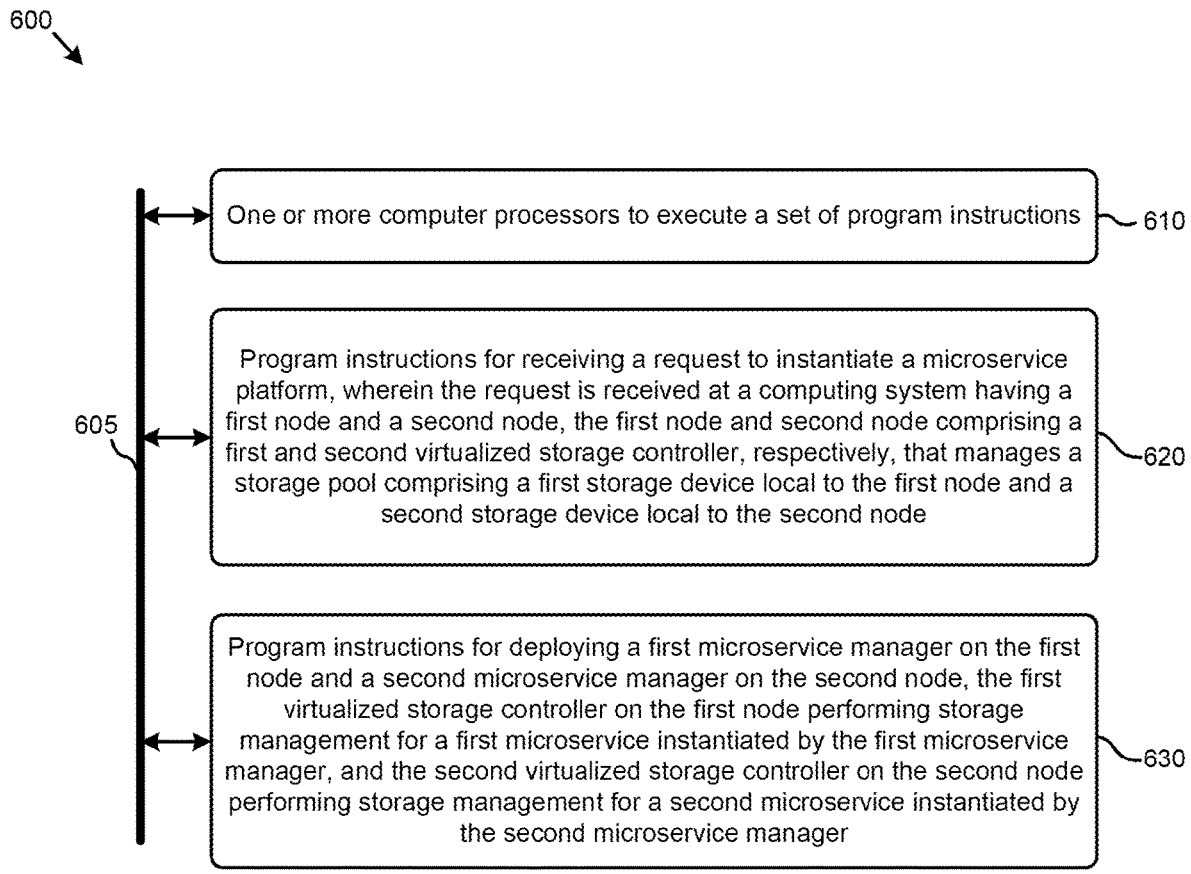
FIG. 6 depicts system components as arrangements of computing modules that are interconnected so as to implement certain of the herein-disclosed embodiments.

FIG. 6 depicts a system 600 as an arrangement of computing modules that are interconnected so as to operate cooperatively to implement certain of the herein-disclosed embodiments. This and other embodiments present particular arrangements of elements that, individually or as combined, serve to form improved technological processes that address hosting highly performant and highly resilient microservices in virtualized computing systems. The partitioning of system 600 is merely illustrative and other partitions are possible. As an option, the system 600 may be implemented in the context of the architecture and functionality of the embodiments described herein. Of course, however, the system 600 or any operation therein may be carried out in any desired environment. The system 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with any other operations over communication path 605. The modules of the system can, individually or in combination, perform method operations within system 600. Any operations performed within system 600 may be performed in any order unless as may be specified in the claims. The shown embodiment implements a portion of a computer system, presented as system 600, comprising one or more computer processors to execute a set of program code instructions (module 610) and modules for accessing memory to hold program code instructions to perform: receiving a request to instantiate a microservice platform, where the request is received at a computing system having a first node and a second node, the first node and second node comprising a first and second virtualized storage controller, respectively, that manages a storage pool comprising a first storage device local to the first node and a second storage device local to the second node (module 620); and deploying a first microservice manager on the first node and a second microservice manager on the second node, the first virtualized storage controller on the first node performing storage management for a first microservice instantiated by the first microservice manager and the second virtualized storage controller on the second node performing storage management for a second microservice instantiated by the second microservice manager (module 630).

Variations of the foregoing may include more or fewer of the shown modules. Certain variations may perform more or fewer (or different) steps and/or certain variations may use data elements in more, or in fewer, or in different operations. Still further, some embodiments include variations in the operations performed, and some embodiments include variations of aspects of the data elements used in the operations.

Strictly as one example variation, the acts involved in deploying a first microservice manager on the first node and also the acts involved in deploying a second microservice manager on the second node involve transmitting a first instruction (or set of instructions) to the first node to deploy a first microservice manager and transmitting a second instruction (or set of instructions) to the second node to deploy a second microservice manager. In this and other deployment scenarios, the first virtualized storage controller on the first node performs storage management functions for a first microservice that is instantiated by the first microservice manager, and the second virtualized storage controller on the second node performs storage management functions for a second microservice that is instantiated by the second microservice manager.

The same set of program instructions corresponding to the operations of the system can be executed by multiple nodes of a cluster, where different nodes take on different roles. In such a scenario, the same set of program instructions are stored into a computer readable medium. The same instructions can be executed by any of the multiple nodes such that the system cooperatively perform a respective set of acts based on corresponding roles of the nodes and their node-specific configurations. For example, when executing the program instructions on a first node, the system implements a first virtualized storage controller that manages a first storage pool comprising a first storage device local to the first node. At the same time, when the program instructions are executing on the second node, the system implements a second virtualized storage controller that manages a second storage pool comprising a second storage device local to the second node. Such a virtualized storage controller can access both node-local storage devices as well as storage devices that are local to other nodes.

The nodes operate cooperatively such that their respective operations result in deployment of a first microservice manager and deployment of a second microservice manager. As discussed hereinabove the target location of the first microservice manager and the second microservice manager is determined based on many factors, including factors pertaining to resilience, and/or data locality as well as other factors. The aforementioned first microservice manager and second microservice manager cooperates with their respective storage controllers to facilitate provision of storage services for microservices. Specifically, the first virtualized storage controller on the first node performs storage management for a first microservice instantiated by the first microservice manager, and the second virtualized storage controller on the second node performs storage management for a second microservice instantiated by the second microservice manager.

In yet another embodiment, the nodes operate cooperatively such that their respective execution of instructions stored on a non-transitory computer readable medium causes a first node to implement microservice platform deployment functionality, so as to determine which of a plurality of nodes can serve as candidate nodes to host two or more microservice management agents. Also, execution of instructions from the same non-transitory computer readable medium causes a second node to implement an instance of a microservice management agent that corresponds to at least one resilient microservice. In event of an equipment failure, the microservice management agent responds to the equipment failure by taking over provision of the microservices a failed node.

System Architecture Overview

Additional System Architecture Examples

Figure 7A:
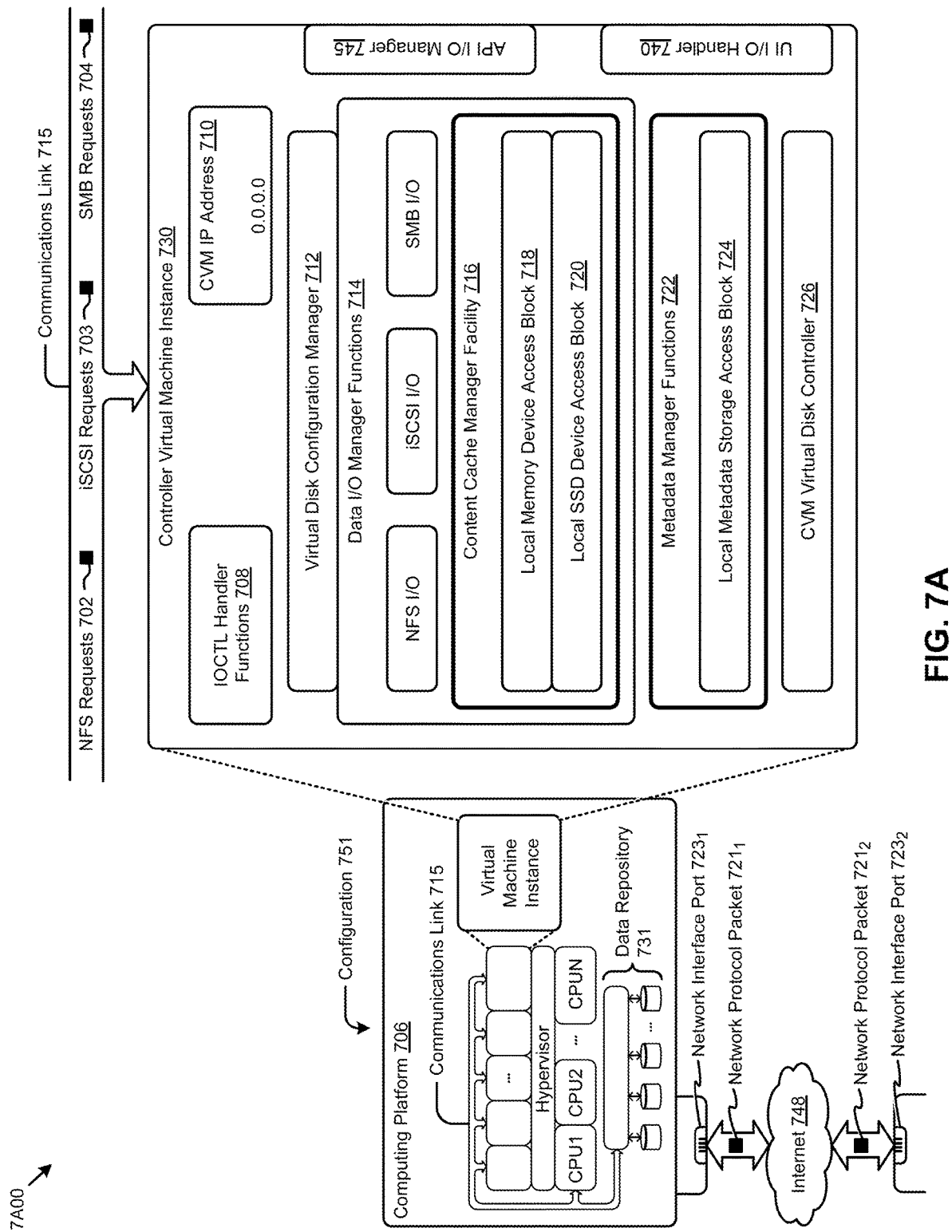
FIG. 7A, FIG. 7B, and FIG. 7C depict virtualized storage controller architectures comprising collections of interconnected components suitable for implementing embodiments of the present disclosure and/or for use in the herein-described environments.

FIG. 7A depicts a virtualized storage controller as implemented by the shown virtual machine architecture 7A00. The heretofore-disclosed embodiments, including variations of any virtualized storage controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 7A00 comprises a collection of interconnected components suitable for implementing embodiments of the present disclosure and/or for use in the herein-described environments. Moreover, virtual machine architecture 7A00 includes a virtual machine instance in configuration 751 that is further described as pertaining to controller virtual machine instance 730. Configuration 751 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 730.

In this and other configurations, a controller virtual machine instance receives block I/O storage requests as network file system (NFS) requests in the form of NFS requests 702, and/or internet small computer storage interface (iSCSI) block IO requests in the form of iSCSI requests 703, and/or Samba file system (SMB) requests in the form of SMB requests 704. The controller virtual machine (CVM) instance publishes and responds to an internet protocol (IP) address (e.g., CVM IP address 710). Various forms of input and output can be handled by one or more IO control handler functions (e.g., IOCTL handler functions 708) that interface to other functions such as data IO manager functions 714 and/or metadata manager functions 722. As shown, the data IO manager functions can include communication with virtual disk configuration manager 712 and/or can include direct or indirect communication with any of various block IO functions (e.g., NFS IO, iSCSI IO, SMB IO, etc.).

In addition to block IO functions, configuration 751 supports IO of any form (e.g., block IO, streaming IO, packet-based IO, HTTP traffic, etc.) through either or both of a user interface (UI) handler such as UI IO handler 740 and/or through any of a range of application programming interfaces (APIs), possibly through API IO manager 745.

Communications link 715 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. As shown, controller virtual machine instance 730 includes content cache manager facility 716 that accesses storage locations, possibly including local dynamic random access memory (DRAM) (e.g., through local memory device access block 718) and/or possibly including accesses to local solid state storage (e.g., through local SSD device access block 720).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 731, which in turn can be formatted into any one or more storage areas, and which can comprise parameterized storage accessible by a key (e.g., a filename, a table name, a block address, an offset address, etc.). Data repository 731 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 724. The data repository 731 can be configured using CVM virtual disk controller 726, which can in turn manage any number or any configuration of virtual disks.

Execution of a sequence of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 751 can be coupled by communications link 715 (e.g., backplane, LAN, PSTN, wired or wireless network, etc.) and each instance may perform respective portions of sequences of instructions as may be required to practice embodiments of the disclosure.

The shown computing platform 706 is interconnected to the Internet 748 through one or more network interface ports (e.g., network interface port $723_1$ and network interface port $723_2$). Configuration 751 can be addressed through one or more network interface ports using an IP address. Any operational element within computing platform 706 can perform sending and receiving operations using any of a range of network protocols, possibly including network protocols that send and receive packets (e.g., network protocol packet $721_1$ and network protocol packet $721_2$).

Computing platform 706 may transmit and receive messages that can be composed of configuration data and/or any other forms of data and/or instructions organized into a data structure (e.g., communications packets). In some cases, the data structure includes program instructions (e.g., application code) communicated through the Internet 748 and/or through any one or more instances of communications link 715. Received program instructions may be processed and/or executed by a CPU as it is received and/or program instructions may be stored in any volatile or non-volatile storage for later execution. Program instructions can be transmitted via an upload (e.g., an upload from an access device over the Internet 748 to computing platform 706). Further, program instructions and/or the results of executing program instructions can be delivered to a particular user via a download (e.g., a download from computing platform 706 over the Internet 748 to an access device).

Configuration 751 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

As used herein, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to deploying a fault-tolerant microservice platform into highly available virtualized computing systems. In some embodiments, a module may include one or more state machines and/or combinational logic used to implement or facilitate the operational and/or performance characteristics pertaining to deploying a fault-tolerant microservice platform into highly available virtualized computing systems.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of deploying a fault-tolerant microservice platform into highly available virtualized computing systems). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to deploying a fault-tolerant microservice platform into highly available virtualized computing systems, and/or for improving the way data is manipulated when performing computerized operations pertaining to selecting nodes at which to host microservices based on performance and availability metrics.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 7B:
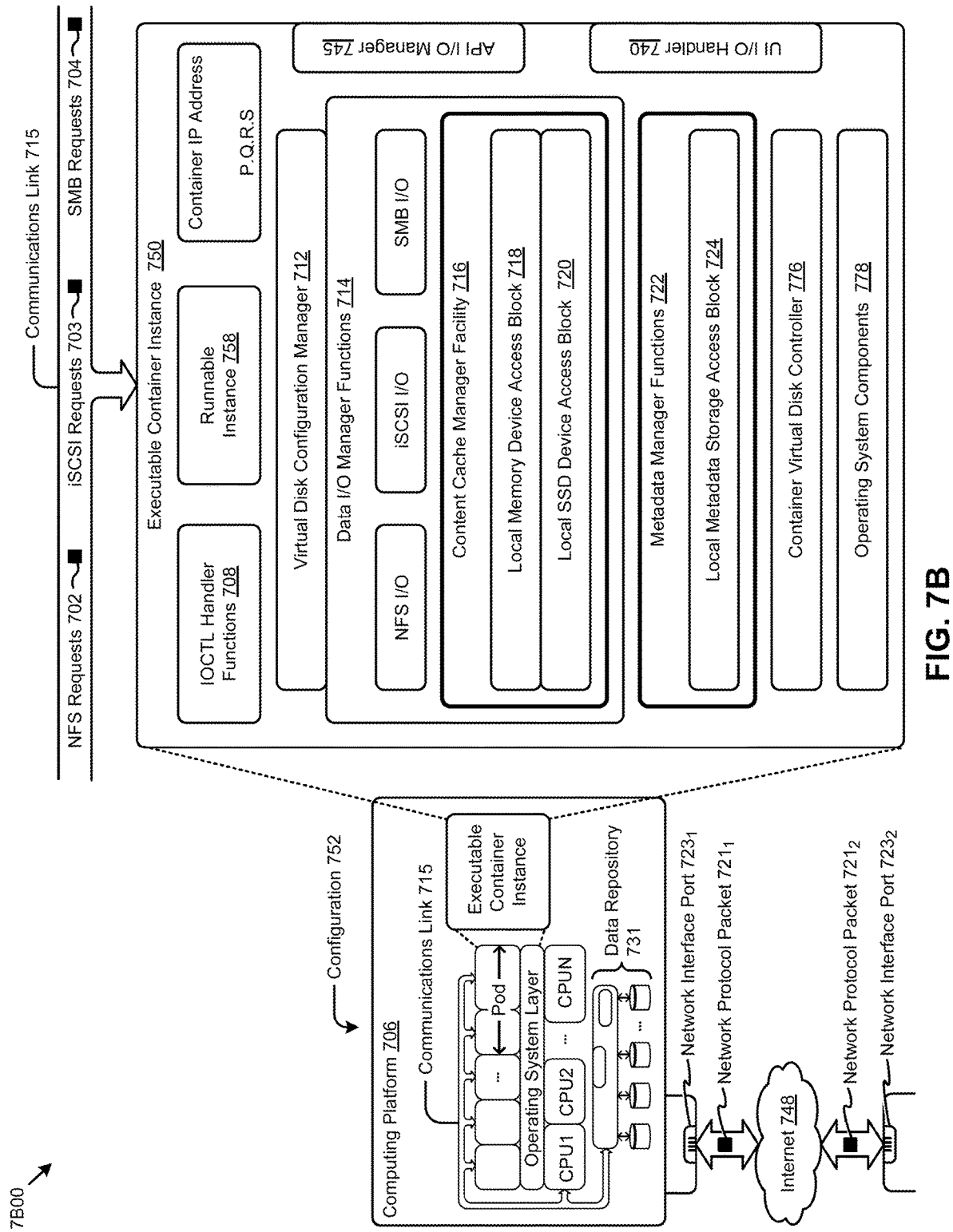

FIG. 7B depicts a virtualized storage controller implemented by containerized architecture 7B00. The containerized architecture comprises a collection of interconnected components suitable for implementing embodiments of the present disclosure and/or for use in the herein-described environments. Moreover, the shown containerized architecture 7B00 includes an executable container instance in configuration 752 that is further described as pertaining to executable container instance 750. Configuration 752 includes an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification (e.g., "http:") and possibly handling port-specific functions. In this and other embodiments, external requestors (e.g., user virtual machines or other processes) rely on the aforementioned addressing functions to access a virtualized storage controller for performing all data storage functions. Furthermore, when data input or output requests are received from a requestor running on a first node are received at the virtualized storage controller on that first node, then in the event that the requested data is located on a second node, the virtualized storage controller on the first node accesses the requested data by forwarding the request to the virtualized storage controller running at the second node. In some cases, a particular input or output request might be forwarded again (e.g., an additional or Nth time) to further nodes. As such, when responding to an input or output request, a first virtualized storage controller on the first node might communicate with a second virtualized storage controller on the second node, which second node has access to particular storage devices on the second node or, the virtualized storage controller on the first node may communicate directly with storage devices on the second node.

The operating system layer can perform port forwarding to any executable container (e.g., executable container instance 750). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container or as a controller executable container. Any executable container of any sort can be rooted in a directory system, and can be configured to be accessed by file system commands (e.g., "ls" or "ls-a", etc.). The executable container might optionally include operating system components 778, however such a separate set of operating system components need not be provided. As an alternative, an executable container can include runnable instance 758, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 776. Such a container virtual disk controller can perform any of the functions that the aforementioned CVM virtual disk controller 726 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 7C:
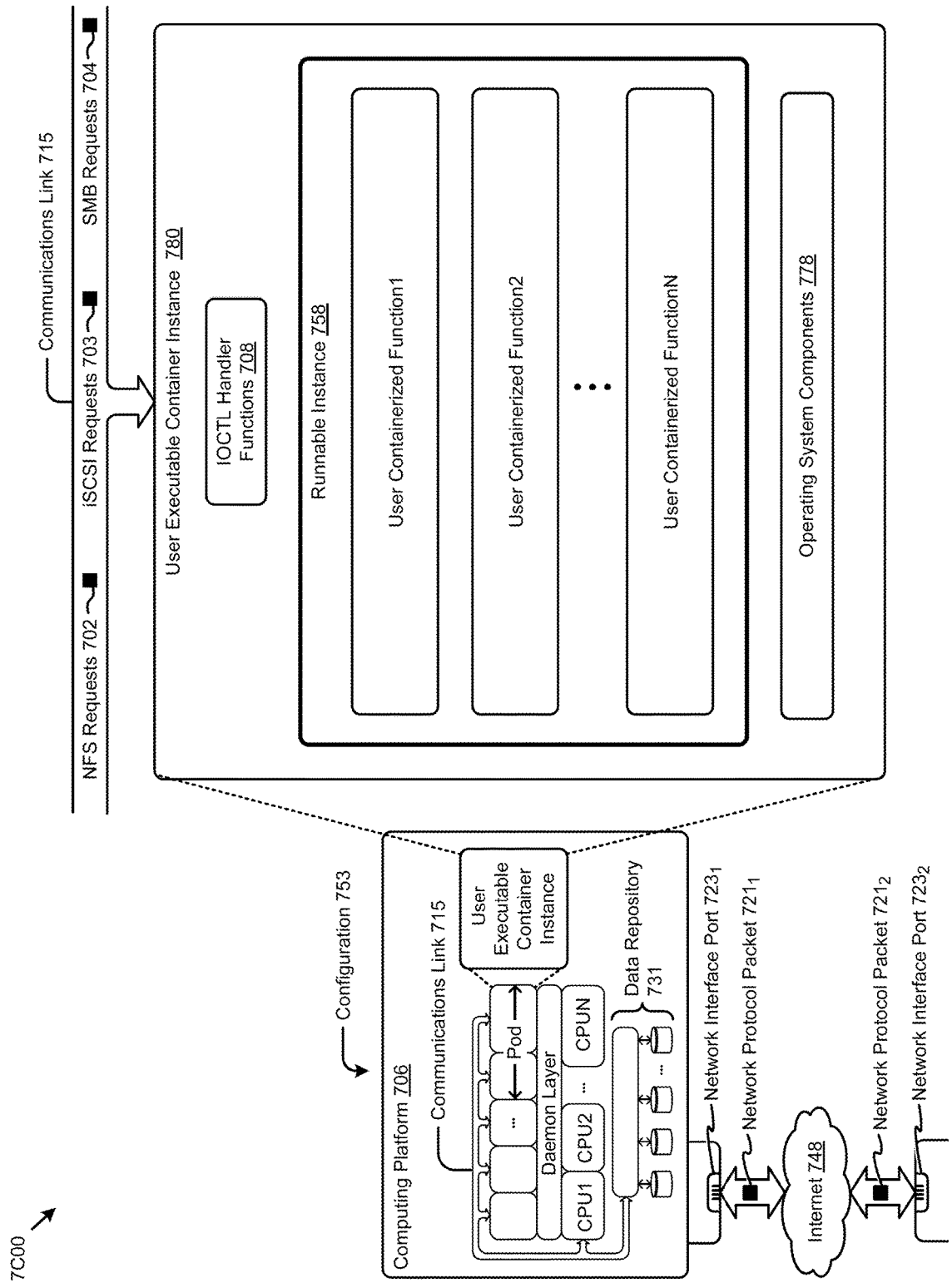

FIG. 7C depicts a virtualized storage controller implemented by a daemon-assisted containerized architecture 7C00. The containerized architecture comprises a collection of interconnected components suitable for implementing embodiments of the present disclosure and/or for use in the herein-described environments. Moreover, the shown daemon-assisted containerized architecture includes a user executable container instance in configuration 753 that is further described as pertaining to user executable container instance 780. Configuration 753 includes a daemon layer (as shown) that performs certain functions of an operating system.

User executable container instance 780 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 758). In some cases, the shown operating system components 778 comprise portions of an operating system, which portions are interfaced with or included in the runnable instance and/or any user containerized functions. In this embodiment of a daemon-assisted containerized architecture, the computing platform 706 might or might not host operating system components other than operating system components 778. More specifically, the shown daemon might or might not host operating system components other than operating system components 778 of user executable container instance 780.

The virtual machine architecture 7A00 of FIG. 7A and/or the containerized architecture 7B00 of FIG. 7B and/or the daemon-assisted containerized architecture 7C00 of FIG. 7C can be used in any combination to implement a distributed platform that contains multiple servers and/or nodes that manage multiple tiers of storage where the tiers of storage might be formed using the shown data repository 731 and/or any forms of network accessible storage. As such, the multiple tiers of storage may include storage that is accessible over communications link 715. Such network accessible storage may include cloud storage or networked storage (e.g., a SAN or storage area network). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term "vDisk" refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 751 of FIG. 7A) to manage the interactions between the underlying hardware and user virtual machines or containers that run client software.

Distinct from user virtual machines or user executable containers, a special controller virtual machine (e.g., as depicted by controller virtual machine instance 730) or as a special controller executable container is used to manage certain storage and I/O activities. Such a special controller virtual machine is referred to as a "CVM", or as a controller executable container, or as a service virtual machine (SVM), or as a service executable container, or as a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A non-transitory computer readable medium having stored thereon a sequence of instructions which, when stored in memory and executed by one or more processors causes the one or more processors to perform a set of acts, the set of acts comprising:
   implementing a microservice platform, wherein the microservice platform comprises a plurality of nodes having respective local storage that together form a storage pool;
   hosting a microservice as a virtual entity on a node from among the plurality of nodes that form the storage pool, the microservice being associated with storage data located within the storage pool;
   performing locality analysis for the microservice relative to the storage data; and
   based upon performing the locality analysis, migrating the storage data to the node that is hosting the microservice.

2. The non-transitory computer readable medium of claim 1, wherein a controller is deployed to manage operation of the microservice within the microservice platform to provide fault tolerance in the event of a failure.

3. The non-transitory computer readable medium of claim 1, wherein the microservice platform is deployed within a hyperconverged computing system.

4. The non-transitory computer readable medium of claim 1, wherein the microservice platform is deployed within a computing cluster, and the plurality of nodes having the respective local storage form members of the computing cluster.

5. The non-transitory computer readable medium of claim 1, wherein a topology and performance metrics are generated with respect to the plurality of nodes for the microservice platform, and deployment of the microservice is based at least in part upon the topology and the performance metrics.

6. The non-transitory computer readable medium of claim 5, wherein the performance metrics comprise at least a CPU availability metric, and a decision to locate the microservice at the node is based at least in part on the CPU availability metric.

7. The non-transitory computer readable medium of claim 1, wherein the microservice platform manages microservices across multiple clusters.

8. The non-transitory computer readable medium of claim 1, wherein the locality analysis is performed by determining a first node at which the microservice is located, and determining a second node at which the storage data for the microservice is located.

9. The non-transitory computer readable medium of claim 1, wherein rebalancing to locate the storage data at the node that is hosting the microservice is performed if a data locality metric exceeds a threshold.

10. The non-transitory computer readable medium of claim 1, wherein the microservice is migrated to the node to implement a locality requirement to locate the storage data at the node that is hosting the microservice.

11. The non-transitory computer readable medium of claim 1, wherein the storage data for the microservice is migrated to the node to implement a locality requirement to locate the storage data at the node that is hosting the microservice.

12. The non-transitory computer readable medium of claim 1, wherein data locality specification or requirement is established for the microservice platform, wherein the data locality specification or requirement is used by the microservice platform to implement a locality selection of the node for the microservice.

13. A method, comprising:
   implementing a microservice platform, wherein the microservice platform comprises a plurality of nodes having respective local storage that together form a storage pool;
   hosting a microservice as a virtual entity on a node from among the plurality of nodes that form the storage pool, the microservice being associated with storage data located within the storage pool;
   performing locality analysis for the microservice relative to the storage data; and
   based upon performing the locality analysis, migrating the storage data to the node that is hosting the microservice.

14. The method of claim 13, wherein a controller is deployed to manage operation of the microservice within the microservice platform to provide fault tolerance in the event of a failure.

15. The method of claim 13, wherein the microservice platform is deployed within a hyperconverged computing system.

16. The method of claim 13, wherein the microservice platform is deployed within a computing cluster, and the plurality of nodes having the respective local storage form members of the computing cluster.

17. The method of claim 13, wherein a topology and performance metrics are generated with respect to the plurality of nodes for the microservice platform, and deployment of the microservice is based at least in part upon the topology and the performance metrics.

18. The method of claim 17, wherein the performance metrics comprise at least a CPU availability metric, and a decision to locate the microservice at the node is based at least in part on the CPU availability metric.

19. The method of claim 13, wherein the microservice platform manages microservices across multiple clusters.

20. The method of claim 13, wherein the locality analysis is performed by determining a first node at which the microservice is located, and determining a second node at which the storage data for the microservice is located.

21. The method of claim 13, wherein rebalancing to locate the storage data at the node that is hosting the microservice is performed if a data locality metric exceeds a threshold.

22. The method of claim 13, wherein the microservice is migrated to the node to implement a locality requirement to locate the storage data at the node that is hosting the microservice.

23. The method of claim 13, wherein the storage data for the microservice is migrated to the node to implement a locality requirement to locate the storage data at the node that is hosting the microservice.

24. The method of claim 13, wherein data locality specification or requirement is established for the microservice platform, wherein the data locality specification or requirement is used by the microservice platform to implement a locality selection of the node for the microservice.

25. A system, comprising:
a storage medium having stored thereon a sequence of instructions; and
one or more processors that execute the instructions to cause the one or more processors to perform a set of acts, the set of acts comprising,
implementing a microservice platform, wherein the microservice platform comprises a plurality of nodes having respective local storage that together form a storage pool;
hosting a microservice as a virtual entity on a node from among the plurality of nodes that form the storage pool, the microservice being associated with storage data located within the storage pool;
performing locality analysis for the microservice relative to the storage data; and
based upon performing the locality analysis, migrating the storage data to the node that is hosting the microservice.

26. The system of claim 25, wherein a controller is deployed to manage operation of the microservice within the microservice platform to provide fault tolerance in the event of a failure.

27. The system of claim 25, wherein the microservice platform is deployed within a hyperconverged computing system.

28. The system of claim 25, wherein the microservice platform is deployed within a computing cluster, and the plurality of nodes having the respective local storage form members of the computing cluster.

29. The system of claim 25, wherein a topology and performance metrics are generated with respect to the plurality of nodes for the microservice platform, and deployment of the microservice is based at least in part upon the topology and the performance metrics.

30. The system of claim 25, wherein the microservice platform manages microservices across multiple clusters.

31. The system of claim 25, wherein the storage data for the microservice is migrated to the node to implement a locality requirement to locate the storage data at the node that is hosting the microservice.

\* \* \* \* \*